(12) United States Patent
Fujita et al.

(10) Patent No.: US 6,600,874 B1
(45) Date of Patent: Jul. 29, 2003

(54) METHOD AND DEVICE FOR DETECTING STARTING AND ENDING POINTS OF SOUND SEGMENT IN VIDEO

(75) Inventors: Takehiro Fujita, Mitaka (JP); Takafumi Miyatake, Hachioji (JP); Akio Nagasaka, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/341,471
(22) PCT Filed: Mar. 19, 1997
(86) PCT No.: PCT/JP97/00905
  § 371 (c)(1),
  (2), (4) Date: Jul. 12, 1999
(87) PCT Pub. No.: WO98/41978
  PCT Pub. Date: Sep. 24, 1998

(51) Int. Cl.$^7$ .................................................. H04N 5/76
(52) U.S. Cl. .............................. 386/96; 386/52; 386/54
(58) Field of Search ................................ 386/39, 4, 52, 386/54, 55, 75, 95, 99, 104, 96; 369/83; 360/13; 704/200, 201, 214, 208, 226, 227, 228, 246, 247, 248, 250, 251, 253, 255, 270, 270.1, 275; H04N 5/76, 5/781, 9/79, 5/92

(56) References Cited

U.S. PATENT DOCUMENTS

| | | | |
|---|---|---|---|
| 5,596,680 A | | 1/1997 | Chow et al. |
| 5,732,392 A | * | 3/1998 | Mizuno et al. ............. 704/233 |
| 6,134,524 A | * | 10/2000 | Peters et al. .............. 704/233 |
| 6,314,395 B1 | * | 11/2001 | Chen ........................ 704/233 |

FOREIGN PATENT DOCUMENTS

JP  9-91928  4/1997

OTHER PUBLICATIONS

"Audio Characterization for Video Indexing", N. Patel et al, Vision and Neural Networks Laboratory, Dept. of Computer Science, Wayne State University, Detroit, MI, SPIE vol. 2670, pp. 373–380.

"Immersion into Visual Media: New Applications of Image Understanding", T. Kanade , Robotics Institute, Carnegie Mellon University, 2/96, pp. 73–80.

* cited by examiner

Primary Examiner—Thai Tran
(74) Attorney, Agent, or Firm—Antonelli, Terry, Stout & Kraus, LLP

(57) ABSTRACT

An envelope arithmetic device for determining arithmetically an envelope of a sound signal waveform associated with video image signals inputted on a time-serial basis, a sound level threshold setting device for setting previously a threshold value of sound level for values of the above-mentioned envelope and a start/end point detecting device for detecting points at which the above-mentioned threshold level and the above-mentioned envelope intersect each other as the start and end points of the sound segment are provided for thereby arithmetically determining an envelope of a sound waveform associated with the video for detecting as the start point of the sound segment a point at which the value of the envelope exceeds the threshold of the sound level while detecting as the end point a point at which the value of the envelope becomes smaller than the threshold value. The interval of the video corresponding to the start point and the end point is registered in terms of a number identify a frame constituting a part of the motion pictures.

26 Claims, 8 Drawing Sheets

METHOD AND DEVICE FOR DETECTING STARTING AND ENDING POINTS OF SOUND SEGMENT IN VIDEO

TECHNICAL FIELD

The present invention relates to a method and an apparatus for detecting sound segments of audio data associated with moving pictures such as a video program recorded on a video tape or a disk, and is concerned with a method and an apparatus which can simplify indexing of a leading position of an audio sequence or interval in a video program.

BACKGROUND TECHNIQUES

With the advent of high-speed computers and availability of memory devices or storages of large capacity in recent years as the background, it becomes now possible to handle a mass of moving pictures and associated audio information through digitization thereof. In particular, in the field of the editing of moving pictures and management thereof, the digitized moving pictures can be handled or processed by the pick-up device and the editing apparatus as well as the managing apparatus for production of video programs. As one of these apparatuses, there can be mentioned a CM managing apparatus (also known under the name of CM bank) which is designed for managing several thousand varieties of commercial video segments (video clips) (hereinafter also referred to as the CM or CM video) for preparing given CM videos (video clips) in the order for broadcasting. Heretofore, a plurality of CM video materials have been recorded on a single video tape before broadcasting. In these years, such a CM managing apparatus can also be made use of which is designed for broadcasting the CM video materials supplied from producers thereof such as advertizing agencies. The CM video materials have been supplied individually on a program-by-program basis in the form of video tapes, respectively, wherein video supplied as the mother material contains the name or identifier of the producer and data concerning the production in addition to the intrinsic CM video entity. Further, so-called idle pictures are inserted, respectively, in precedence and in succession to the CM video for several seconds for the purpose of realizing alignment in timing upon the broadcasting. Such being the circumstances, there arises necessity of registering a start and an end of the CM video (clip) to be broadcast in addition to the storage of the mother material supplied from the producer on another recording medium such as a tape, disk or the like by copying.

The work for checking the start and the end of the CM video is currently carried out thoroughly manually, which has imposed an heavy burden on the operator in charge. Because the idle pictures are taken, respectively, in continuation to the start and the end of the intrinsic CM video entity, the operator often encounters such situation that the extent of the CM video to be really broadcast can not be discerned merely through visual observation or check. In the case of the CM video or the like which is constituted by a combination of audio and video, the operator determines discriminatively the start and the end of the video by checking auditorily the sound in the idle intervals in the video (clip) because no sound is recorded in the idle intervals. In the present state of the art, there is unavailable any other method than the one in which the operator decides auditorily the presence or absence of sound by repeating manipulation such as reproduction or play of the video, stoppage or pause, reverse reproduction or reverse play, etc. These manipulations are certainly improved by adopting a dial such as a jog, a shuttle or the like in the video reproducing apparatus or by making use of a scroll bar on an image screen of a computer. However, such manipulations still incur not a little consumption of man power.

With the present invention, it is contemplated as an object thereof to provide a method and an apparatus which make it possible to automate the work involved in deciding auditorily the presence or absence of sound at the start and the end of a CM video (clip) upon registration of CM video material while automating operation for the registration for simplification thereof.

Another object of the present invention is to provide a method and an apparatus for detecting the start and end points of an intrinsic CM video entity on a real-time basis for registering the positions of the start and end points, respectively.

DISCLOSURE OF THE INVENTION

In an interactive registration processing for registering a video in a video managing apparatus, it is taught according to the present invention to provide an envelope arithmetic means for determining arithmetically an envelope of waveform of a sound signal inputted on a time-serial basis, a sound level threshold value setting means for setting previously a threshold value of sound level for comparison with values of the envelope, and a start/end point detecting means for detecting a time point at which the envelope intersects the level of the aforementioned threshold value as a start point or an end point of a sound segment, to thereby allow the presence or absence of the sound determined heretofore with the auditory sense to be decided quantitatively and automatically. In that case, the start/end point detecting means mentioned above is provided with a silence time duration lower limit setting means for setting previously a lower limit on the duration of a silence state, a silence time duration arithmetic means for determining arithmetically an elapsed time during which the value of the envelope of the sound signal waveform has remained smaller than the threshold value of the sound level, and a silence time duration decision means for deciding that the above-mentioned silence time duration has exceeded the lower limit so that sound interruption of extremely short duration such as punctuation between phrases in a speech can be excluded from the detection. Similarly, the start/end point detecting means mentioned above is provided with a sound time duration lower limit setting means for setting previously a lower limit on the duration of a sound state, a sound time duration arithmetic means for determining arithmetically an elapsed time during which the value of the envelope of the sound signal waveform has exceeded the threshold value of the sound level, and a sound time duration decision means for deciding that the sound time duration has exceeded the lower limit so that noise or sound of one-shot nature can be prohibited from being detected. Furthermore, the envelope arithmetic means mentioned above is provided with a filtering means for performing a filtering processing having a predetermined constant time duration on the sound signal inputted on a time-serial basis. As the filtering means mentioned above, a maximum value filter for determining sequentially maximum values of a predetermined constant time duration for the sound signal inputted on a time-serial basis and a minimum value filter for determining sequentially minimum values of a predetermined constant time duration for the sound signal inputted on a time-serial basis are employed.

Furthermore, it is taught according to the resent invention that a video reproducing means for reproducing a video material, a sound input means for inputting a sound signal recorded on an audio track of the video for reproduction as a digital signal on a time-serial basis, and a sound processing means for detecting the start and end points of a sound segment from the sound signal as inputted, and a display means for displaying results of the detections are provided, for thereby enabling the position of the start and end points of the sound segment in the video material to be presented to an operator. The sound processing means is provided with a frame position determining means for determining the frame positions of the video at the time points at which the start and end points the sound interval are detected in addition to the envelope arithmetic means, the sound level threshold value setting means and the start/end point detecting means mentioned previously. The frame position determining means mentioned above is provided with a timer means for counting the elapsed time, starting from the beginning of the detection processing, a means for reading out the frame positions of the video (or moving pictures), an elapsed time storage means for storing elapsed time at the time points at which the start and end points mentioned above are detected and elapsed time at a time point at which the frame position mentioned above is read out, and a frame position correcting means for correcting the frame position as read out by using difference between both the elapsed times mentioned above so that a time lag involved in the detection of the start and end points up to the reading of the frame position can be corrected to thereby allow the frame position to be determined at the detection time point. Furthermore, the sound processing means mentioned above is provided with a means for stopping temporarily the reproduction of the video at the start and end points as detected, to thereby enable the reproduction of the video to be paused at the frame positions corresponding to the start and end points. In that case, a video reproducing apparatus capable of controlling the reproduction of the video by a computer is employed as the video reproducing means. By way of example, a video deck equipped with a VISCA (Video System Control Architecture) terminal, a video deck used generally in the editing by the professional or the like may be employed. In this way, head indexing to the sound segment as detected can be realized efficiently.

Furthermore, it is taught according to the present invention that the sound processing means mentioned previously is provided with a frame position storage means for storing individually the frame positions of the start point and the end point of the sound segment, and a display means for displaying individually the frame positions of the start point and the end point so that the positions of the start point and the end point of the sound segment in the video material can be presented individually to the operator. Besides, the sound processing means is provided with a buffer memory means for storing sound signals inputted time-serially on a constant time-duration basis and a reproducing means for reproducing the sound signals as inputted so that the operator can confirm visually and auditorily the sound interval as detected. Furthermore, on the assumption that the picture subjected to the processing is a CM video material and that such a general rule that the CM video entity has a time duration of 15 seconds or 30 seconds per CM program made use of, the sound processing means mentioned above is provided with a time duration setting means for setting previously an upper limit of the length of time duration of the sound segment having a predetermined constant time duration together with a tolerance range of one or two seconds and a time duration comparison means for comparing the length of a detected time duration extending from the start point to the end point of the sound segment as detected with the set time duration length mentioned above for thereby allowing only the sound segment of a predetermined constant time duration to be detected in a CM video (clip). Additionally, the sound processing means is provided with a margin setting means for setting margins at front and rear sides, respectively, of the sound segment as detected so that the CM video (clip) for broadcasting which has the predetermined time duration can be registered in the CM managing apparatus from the CM video material.

BEST MODES FOR CARRYING OUT THE INVENTION

In the following, exemplary embodiments of the present invention will be described by reference to the drawings.

Figure 1:
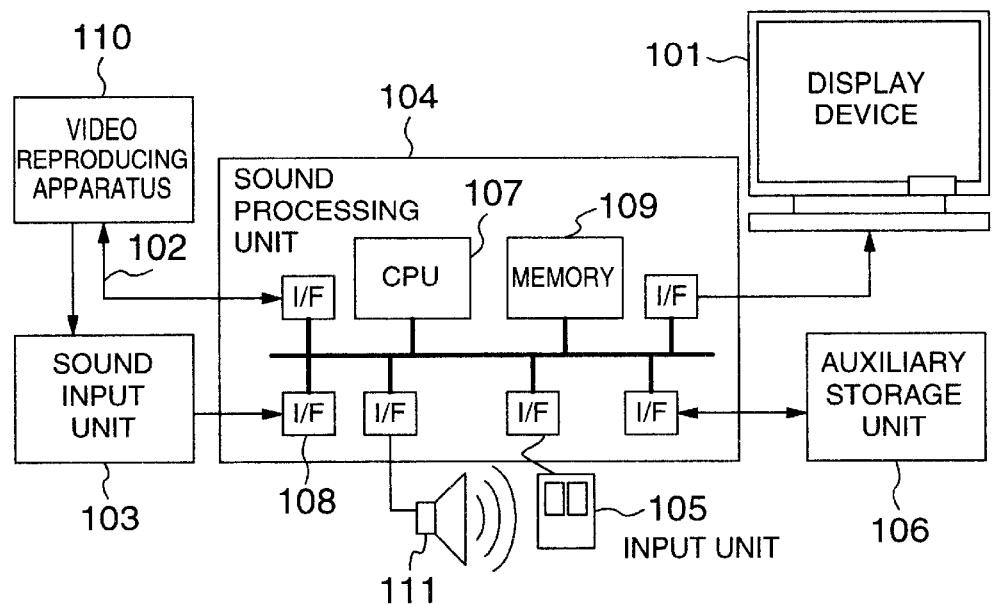
FIG. 1 is a diagram showing a system configuration for realizing embodiments of the present invention.

FIG. 1 is a diagram showing an example of a system configuration for implementing the present invention. Reference numeral 101 denotes a display device such as a CRT or the like for displaying output of an sound processing unit 104. Inputting or setting of commands, threshold values and others for the sound processing unit 104 is carried out by using an input unit 105 which includes a pointing device such as a mouse or the like and a numeric value input device such as a ten-key array or the like. A picture reproducing apparatus 110 is an apparatus which is designed for reproducing pictures recorded on a video tape, an optical disk or the like. A sound signal associated with a video reproduced and outputted by the picture reproducing apparatus 110 sequentially undergoes conversion to a digital signal by a sound input unit 103, the digital signal being then inputted to the sound processing unit 104. Further, information such as a sampling frequency and a sampling bit number used in the conversion to the digital signal, and the channel number indicating monophonic or stereophonic (monophonic being represented by "1" with the stereophonic by "2") and others is transferred to the sound processing unit 104 from the sound input unit 103. Of course, the above information may be supplied to the sound input unit 103 from the sound processing unit 104 as the numeric values set in the sound processing unit 104. The sound processing unit 104 processes the signals as received to thereby control the picture reproducing apparatus 110. Transmission and reception of control commands and responses between the sound processing unit 104 and the video reproducing apparatus 110 are carried out via a communication line 102. In the case where individual frames of the video handled by the video reproducing apparatus 110 are allocated with frame numbers (time codes) in a sequential order, starting from the leading frame of the video, the image of a given frame number can be retrieved by sending the relevant frame number and a search command to the video reproducing apparatus 110 from the sound processing unit 104. Similarly, the sound processing unit 104 can also receive the current frame number of the video from the video reproducing apparatus 110 by issuing the relevant request to the latter. Internally of the sound processing unit 104, the digital signal of sound is once loaded to a memory 109 via an interface 108 and processed by a CPU 107 in accordance with a processing program stored in the memory 109. The processing program is stored in an auxiliary storage unit 106 and transferred to the memory 109 optionally in response to the command issued by the CPU 107. A variety of data generated through processings described hereinafter is stored accumulatively in the memory 109 and can be referenced as occasion requires. The sound digital signal and various information such as information resulting from processings and the like can also be stored in the auxiliary storage unit 106. A loudspeaker 111 reproduces the sound signal inputted to the sound processing unit 104 from the sound input unit 103 synchronously with the inputting as well as the sound signal stored in the memory 109 in response to the user's demand.

In the following, description will be directed firstly to a method of detecting sound segments associated with a video, which method allows the user to detect easily the sound segments in the video while confirming or observing the video. In succession, description will be made of a sound segment detecting apparatus which is realized by adopting the method mentioned above, which will be followed by the description concerning a method of finding a broadcasting-destined CM video of a predetermined constant time duration from a CM video material.

Figure 2:
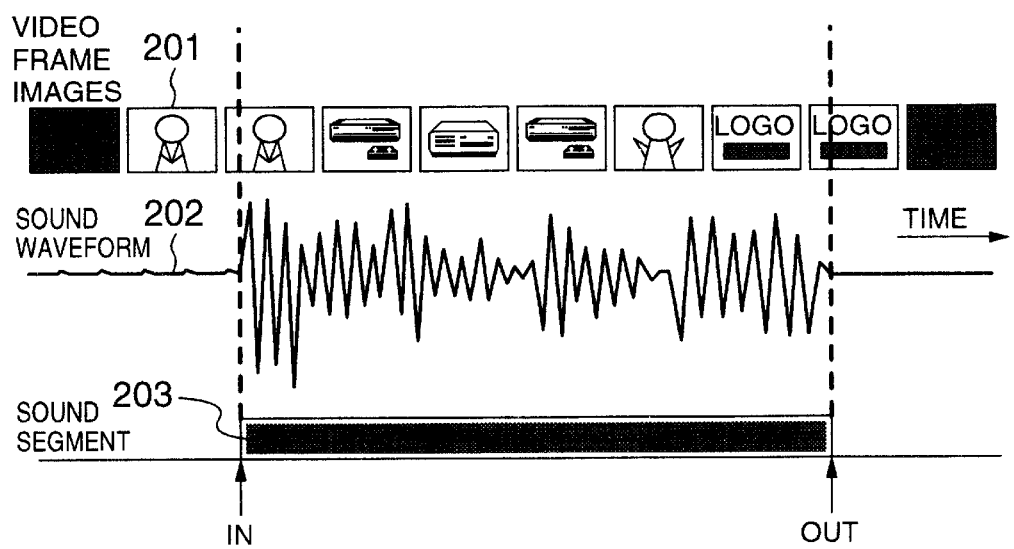
FIG. 2 is a conceptual view for illustrating a method of detecting a sound segment according to the present invention.

FIG. 2 is a schematic diagram for illustrating schematically the method of detecting the sound segment contained in the picture according to the present invention.

Motion pictures 201 and a sound waveform 202 represents illustratively signals of image and sound, respectively, contained in a video. Although the sound waveform 202 is shown as being monophonic for simplification of the description, it may be stereophonic. In the case where the video of concern is a CM video material, idle pictures each of several-second duration are inserted in precedence and succession to an intrinsic CM video entity. Ordinarily, the idle pictures are photographed continuously in precedence and in succession to the intrinsic CM video entity and same as the leading and trailing images (frames), respectively, of the latter. Consequently, in many cases, difficulty or impossibility is encountered in discerning the CM video to be broadcast on the basis of observation of only the motion pictures 201. In the idle picture intervals, however, no sound is recorded. Such being the circumstances, the head and the end of the intrinsic CM video entity have heretofore been determined by the operator by deciding the presence or absence of the sound in the picture while repeating operations such as forward play, stop, reverse play and the like.

According to the present invention, it is taught to automate the decision based on the auditory sense such as mentioned above by detecting the sound segment.

In the sound waveform 202, amplitudes of plus and minus values make appearance alternately and frequently and may assume instantaneously magnitude of zero very frequently. Accordingly, solely with the check of magnitude of the amplitude at a given moment, the presence or absence of the sound around that time point can not always be discerned. According to the instant embodiment, magnitude of the sound is determined on the basis of values of an envelope of the sound waveform 202. A value of the envelope can represent reflectively the presence or absence of the sound around that value. A point at which the value of the envelope exceeds a threshold value of a predetermined sound level is detected as the start point (IN) of the sound segment 203 while a point at which the envelope value becomes smaller than the threshold value is detected as an end point (OUT). By storing the sound data string from the start point to the end point in the memory 109 or the auxiliary storage unit 106 and reproducing the data, confirmation or discernment of the contents of the sound in the sound segment 203 can also easily be realized. The positions in the video corresponding to these detection points can be determined in terms of frame numbers. At the time points when the transition point such as the start point or end point of the sound segment 203 is detected, the video which succeeds to the transition point has already been reproduced by the video reproducing apparatus 110. Accordingly, the frame number corresponding to the detection time point is read out or fetched from the video reproducing apparatus 110, whereon the frame number corresponding to the transition point is derived by using difference between the time point at which the frame number was read out from the video reproducing apparatus 110 and the time point at which the transition point occurred, to thereby determine arithmetically the frame number corresponding to the transition point. A method of deriving or determining the frame number will be elucidated later on by referring to FIG. 7. By detecting the sound segment by making use of the envelope and establishing correspondence between the original video and the sound interval by making use of the frame number, the picture interval during which the sound continues to exceed a given sound level can be extracted. Further, by sending the frame number of the start point together with a search command to the video reproducing apparatus 110, head indexing of the frame in which the sound rises up can easily be realized. Furthermore, since the time duration extending from the start point to the end point can be known, setting of margins required for making up the CM video for the broadcasting before and after the picture video segment as extracted can easily be realized. In this manner, the CM video (clips) of high quality suffering no dispersion in the time duration can be registered in the CM managing apparatus.

By virtue of the teachings of the present invention, the user who uses the system shown in FIG. 1 is required only to load a video tape or the like having video materials recorded thereon in the video reproducing apparatus 110 and manipulate buttons on a console of the sound processing unit 104 displayed on the display device 101. An example of screen image of the console will be explained later on by reference to FIG. 5. The user can thus get rid of the work for finding out the head and the end of the sound segment associated with the video through manual operation of a jog, a shuttle or the like. Thus, the operation or manipulation can be simplified, to an advantageous effect.

Next referring to FIGS. 3 and 4, the sound segment detecting method will be described in detail.

Figure 3:
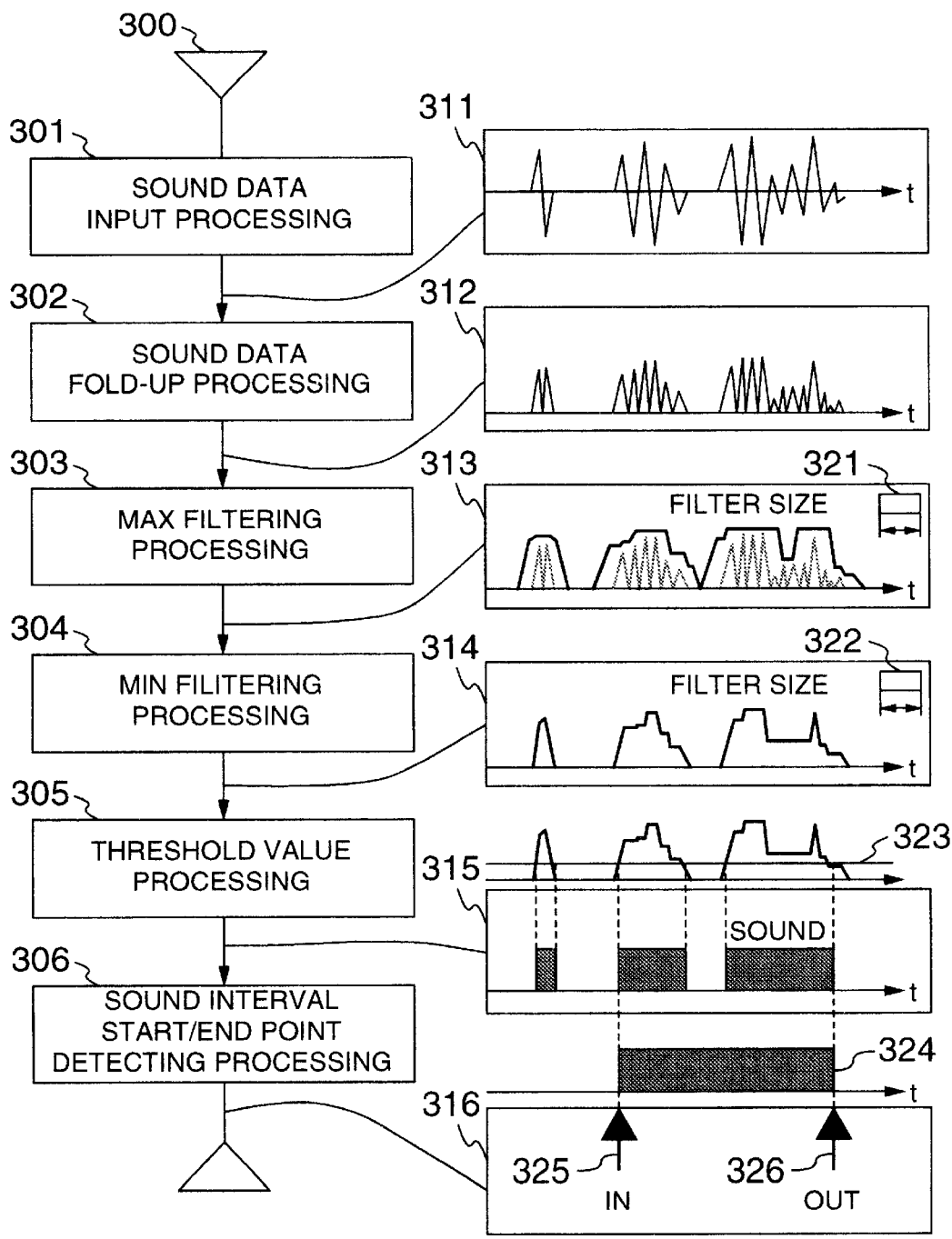
FIG. 3 is a flow chart for illustrating the method of detecting the sound segment according to the present invention.

FIG. 3 is a flow chart for illustrating a method of detecting the start and end points of a sound segment associated with a video according to the present invention.

Reference numerals 301 to 306 designate program steps, respectively, and 311 to 316 designate output data of the individual steps, respectively. These programs and data are all placed on the memory 109 to be executed or processed by the CPU 107. Although the sound waveform is shown as being monophonic (channel number is "1") for simplification of the description, similar procedure may be taken equally even in the case of a stereophonic sound (channel number is "2"). In the case of the stereophonic sound, the processings for the monophonic sound described below may be executed for each of the sound waveforms of the left and right channels, whereon the results of the processings for both the channels may be logically ANDed (determination of logical product) to thereby make decision as to overlap therebetween or alternatively logically ORed (determination of logical sum) for the decision as a whole.

At first, in the step 301, audio data associated with the video is received from the sound input unit 103. Reference numeral 311 designates waveform of the sound data as received. In the step 302, absolute values of individual data carried by the sound waveform 311 are determined to thereby execute fold-up processing for the sound waveform, because only the sound level is of concern regardless of the contents or implication of the sound. Reference numeral 312 designates a sound waveform resulting from the processing for folding up the sound waveform 311 to the plus side. Subsequently, in the steps 303 and 304, an envelope of the waveform 312 is determined through maximum/minimum type filterings. To this end, filters of filter sizes 321 and 322 are prepared for the respective filterings, and the input data are sequentially fetched into the filters for thereby determining the maximum value and the minimum value in the filters to be outputted. In the step 303, the maximum value in the filter is outputted for the waveform 312 on a data-by-data basis. In the step 304, the minimum value in the filter is outputted for the maximum-value waveform 313 on a data-by-data basis. Reference numeral 314 designates envelopes obtained as the result of the filtering processings. In the step 305, a threshold processing is performed for comparing the individual data of the envelopes 314 with a threshold value 323 predetermined for the sound level. When the envelope 314 exceeds the threshold value 323, "1" indicating the presence of sound is outputted, while "1" indicative of the absence of sound is outputted when the envelope is short of the threshold value. Reference numeral 315 designates binary data of the sound and the silence outputted from the processing step 305. Finally, in the step 306, the sound waveform 312 is checked as to the continuity of sound and silence on the basis of the binary data 315 for detecting a sound segment 324, whereon start and end points 316 of the sound segment are outputted. More specifically, the rise point of the sound interval is outputted as a start point 325 (IN) of the sound while the fall point of the sound interval is outputted as an end point 326 (OUT) of the sound. Concerning this step 306, description will be made by referring to a timing chart shown in FIG. 4.

The method of arithmetically determining the envelope through the maximum/minimum type filtering can be realized with remarkably reduced computation overhead when compared with a method of calculating the power spectrum of the sound waveform to thereby determine the power of degree zero as the envelope. Accordingly, the method described above can be carried out even with the CPU whose capability or performance is not so high.

As the one-dimensional maximum/minimum type filtering described above in conjunction with the steps 303 and 304, there may be adopted the filtering procedure described, for example, in "HIGH-SPEED ARITHMETIC PROCEDURE FOR MAXIMUM/MINIMUM TYPE IMAGE FILTERING" (The Institute of Electronics, Information and Communication Engineers of Japan, Theses Collection D-II, Vol. J78-D-II, No. 11, pp. 159–1607, November, 1995). This procedure is a sequential data processing scheme which can be realized by making use of a ring buffer capable of storing (n+1) data for a filter size n. With this procedure, the maximum value and the minimum value can be determined by performing arithmetic operation about three times for one data on an average, regardless of the nature of the data and the filter size. Accordingly, this procedure is suited for the application where a large amount of data has to be processed at high speed as in the instant case.

Figure 4:
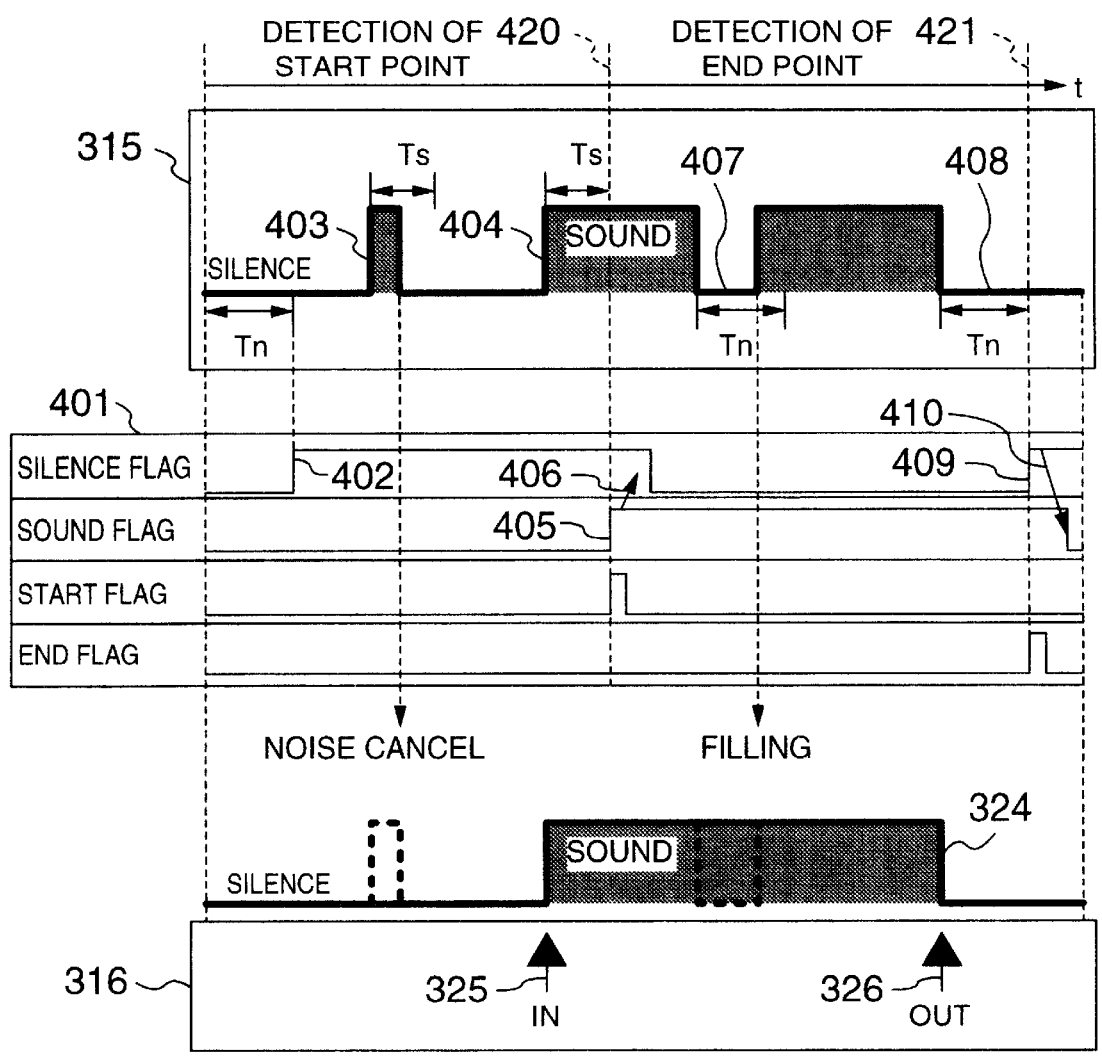
FIG. 4 is a view for illustrating the conditions for deciding the start and end points of a sound segment according to the present invention.

FIG. 4 is a view for illustrating a method of deciding the start and end points of a sound segment.

For making decision as to the start/end point of a sound segment, the conditions for the start/end point decision are defined as follows:

start point: the point at which state transition occurs when the sound state has continued longer than Ts inclusive after the silence state had continued longer than Tn inclusive, and end point: the point at which state transition occurs when the silence state has continued longer than Tn inclusive after the sound state had continued longer than Ts inclusive, where Ts [msec] represents a lower limit for the length of elapsed time of the sound state, and Tn [msec] represents a lower limit for the length of elapsed time of the silence state. Values of Ts and Tn may previously be set with reference to the time duration of one syllable of speech and/or the time duration of a pause intervening between aural statements. In this way, the sound state of a duration shorter than Ts as well as the silence state shorter than Tn can be excluded from the detection. Thus, there can be realized a stable or reliable sound segment detecting method which is insusceptible to the influence of the sound interruption of extremely short duration such as one-shot noise, punctuation between phrases in a speech.

Reference numeral 401 designates generally a timing chart for illustrating a process until the start and end points 316 of a sound interval is determined from the input data 315 in the step 306. As flags for discriminatively identifying the states, there are provided four flags, i.e., a silence flag, a sound flag, a start flag and an end flag.

In the step 306, the input data 315 indicating the binary states of sound and silence are checked sequentially, whereon the numbers of data "0" (silence) and "1" (sound) are counted, respectively, for determining the elapsed times of the sound and silence states, respectively. Since the sampling frequency for digitizing the sound signal has been transferred to the sound processing unit 104 from the sound input unit 103, the time conditions Ts and Tn can easily be replaced by the conditions given in terms of the number of data. Parenthetically, the data number representative of the sound state is cleared at a time point when the silence flag is set "ON", while the data number representative of the silence state is cleared at a time point when the sound flag is set "ON". At the beginning, all the flags are set "OFF" and the data numbers of both the states are set "0". At first, the silence flag is set "ON" at a time point when the silence state has continued for Tn (402). When the silence flag is "ON", the points at which transition to the sound state from the silence state occurs are all selected as the candidates for the start point and the relevant data positions are stored in the memory 109. At first, the rise of a sound state 403 is fetched as a candidate for the start point of the sound state. However, since the elapsed time of the sound state 403 is short of Ts, the data number for the sound state 403 is classified as the data number (elapsed time) for the silence state to be rejected as noise of one-shot nature. Subsequently, the rise of a sound state 404 is fetched as a candidate for the start point, and the sound flag is set "ON" when the sound state has continued for Ts (405). Thus, both the silence flag and the sound flag are now set "ON" to satisfy the conditions for identifying the start point. Accordingly, the start flag is set "ON", and a start point 325 (IN) is determined. The start flag set "ON" is reset "OFF" at a time point when it is sensed. The start point detecting procedure described above is performed up to a point 420 on the time axis.

Upon ending of the detecting procedure for the start point, a detecting procedure for the end point is started in continuation. At first, the silence flag is set "OFF" (406). When the sound flag is "ON", the points at which transition to the silence state from the sound state occurs are all selected as the candidates for the end point, and relevant data positions are stored in the memory 109. Since the elapsed time of the silence state 407 is shorter than Tn, the data of the silence state 407 is switched into a sound state and merged (put) into the sound states in front and behind to be ignored as a silence interval of a bit time. Subsequently, the silence flag is set "ON" when the silence state 408 has continued for Tn (409). Thus, both the sound flag and the silence flag are now set "ON" to satisfy the conditions for identifying the end point. Accordingly, the end flag is set "ON", and the end point 326 (OUT) is determined. The end flag which is set "ON" is reset "OFF" at a time point when it is sensed. Further, the sound flag is also set "OFF" for preparation for the succeeding start point detecting procedure (410). The end point detecting procedure described above is performed up to a point 421 on the time axis.

By manipulating the flags as described above by reference to FIG. 4, the start and end points of the sound segment can be successively detected. Even when a plurality of sound segments are provided in association with one video, each of the individual sound segments can be detected individually. Thus, the sound interval detecting method according to the present invention can find application not only to the CM video materials and the video programs but also other videos in general such as those for TV broadcasting, archive video and the like. Furthermore, in the case where the picture subjected to the processing is a CM video material, such a general rule concerning the time duration of the CM video that "CM clip is to be realized with a time duration of 15 seconds or 30 seconds per CM entity" can be adopted. Thus, even when a plurality of sound segments are detected, these sound segments can be combined together into one set in accordance with the above-mentioned rule for the CM video, whereby the proper start and end points of the intrinsic CM video entity can be determined. Concerning the start/end-point detecting method in which the rule concerning the CM video is adopted will be described later on by reference to FIG. 9.

Now, description will be directed to a sound segment detecting apparatus realized by making use of the sound interval detecting method described above.

Figure 5:
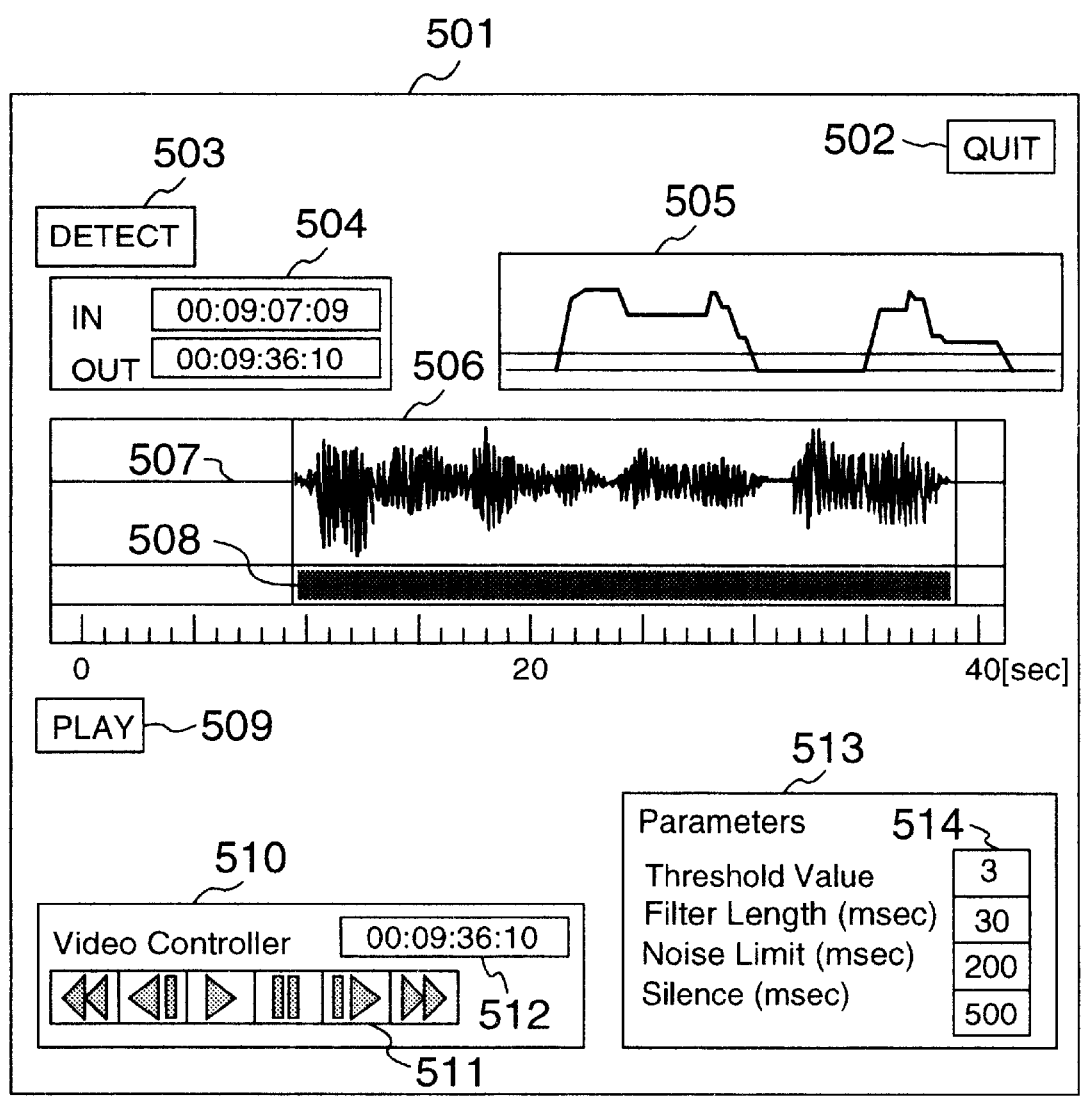
FIG. 5 is a view for illustrating an example of a screen image for manipulation.

FIG. 5 shows an example of a screen image for manipulation or operation of a sound segment detecting apparatus realizing the teachings of the present invention. A manipulation window 501 is displayed on the display device 101 as a console of the sound processing unit 104 to present the environment for manipulation to the user. Within the manipulation window 501, there are disposed a QUIT button 502, a DETECT button 503, a detection result display panel 504, a sound waveform monitor 505, a sound interval display panel 506, a PLAY button 509, a video reproducing apparatus manipulation panel 510 and a parameter setting panel 513. The user can input to the sound processing unit 104 his or her command or request by clicking a relevant command button disposed on the manipulation window 501 with a mouse of the input unit 105. The QUIT button 502 is a command button for inputting a command for closing the manipulation window 501 by terminating the manipulation processing.

The DETECT button 503 is a command button for executing the sound segment detection processing. When the DETECT button 503 is clicked by the user, the sound processing unit 104 clears the detection result display panel 504 and then starts detection of the sound segment in accordance with the program 300, wherein interim result of the processing which is being executed is displayed on the sound waveform monitor 505. Displayed on a sound waveform monitor 505 are the envelope 314 determined arithmetically and the threshold value 323 for the sound level. Upon detection of the start and end points of a sound segment, the frame numbers as detected are displayed on the panel 504 each in terms of a time code of a structure "hh:mm:ss:ff" (hh: hour, mm: minute, ss: second and ff: frame), which is convenient for the user because position and length can be grasped intuitively.

Displayed on the sound interval display panel 506 are a waveform 507 and a sound interval 508 of sound data which have been inputted before the start and end points of the sound segment are detected. The sound segment 508 corresponds to a period from an IN frame to an OUT frame on the detection result display panel 504. Because the time duration of the CM video (clip) is in general 30 seconds at the longest per one CM entity, it is presumed in the instant case that the sound waveform having a time duration of 40 seconds is displayed. The PLAY button 509 is a button for reproducing the sound data of the sound segment 508. The user can visually observe the sound signal associated with the video with the aid of the sound data waveform 507. Besides, by clicking the PLAY button 509 to thereby reproduce the sound, the sound data can also be auditorily confirmed. In this way, the user can ascertain the result of detection immediately after the detection of the sound segment. Thus, the confirmation work can be much simplified.

When the user desires to provide the sound segment with margins, this can be accomplished by widening the interval by dragging the ends or edges of the sound segment 508. Because the start and end points of the sound segment are already known as displayed on the detection result display panel 504, the duration or length of the interval can be arithmetically determined. The user can provide the relevant sound segment with leading and trailing margins so that the time duration of the whole interval inclusive of the margins becomes equal to the desired length. The system alters the frame numbers displayed on the detection result display panel 504 in accordance with the length of the margins as affixed, whereon the altered frame numbers are set as the start and end points of the CM video (clip) to be registered in the CM managing apparatus. In this way, the user can easily proceed with the registration work for the CM managing apparatus. Additionally, by cutting out the video sandwiched between the start and end points of the video for the purpose of registration, the user can prepare a CM video (clip) for broadcasting which has a desired length.

Disposed on the video reproducing apparatus manipulation panel 510 is a set of video reproducing apparatus manipulation buttons 511. The manipulation button set 511 includes command buttons for executing the fast forwarding, rewinding, play, frame-by-frame steeping, pause, and so on. When the user clicks a desired one of the command buttons in the set of video reproducing apparatus manipulation buttons 511, the sound processing unit 104 sends the relevant manipulation command to the video reproducing apparatus 110. The frame position of the video is displayed within the frame position display box 512 in the form of a time code.

Disposed on the parameter setting panel 513 is a parameter setting box 514 for setting parameters for the sound interval detection. Arrayed in the parameter setting panel 513 as the changeable parameters are four parameters, i.e., the threshold value (Threshold Value) of the sound level, time duration length (Filter length) of the filter, lower limit of the length of the elapsed time of the sound state (Noise Limt) and lower limit of the length of the elapsed time of the silence state (Silence). When the user desires to change the parameters, he or she may click the parameter setting box 514 and input relevant numeric values through the input unit 105. For setting the threshold value (Threshold Value in the figure) of the sound level, the threshold value can be set through another procedure described below in addition to the inputting of the relevant value through the input unit 105. At first, when the parameter setting box for the threshold value of the sound level is clicked, the picture reproducing apparatus 110 is stopped or set to the pause. In this state, sound data is inputted to the sound processing unit 104 from the sound input unit 103 for several seconds. Subsequently, the maximum value of the sound level of the sound data inputted for several seconds is selected as the threshold value of the sound level. By inputting the sound data for several seconds, random noise of the sound signal generated in the video reproducing apparatus 110 and the sound input unit 103 can be inputted to the sound processing unit 104. Furthermore, by setting the maximum value of the noise mentioned above as the threshold value of the sound level, the inputted sound signals associated with the video can be protected from the influence of noise generated in the video reproducing apparatus 110 and the sound input unit 103.

Figure 6:
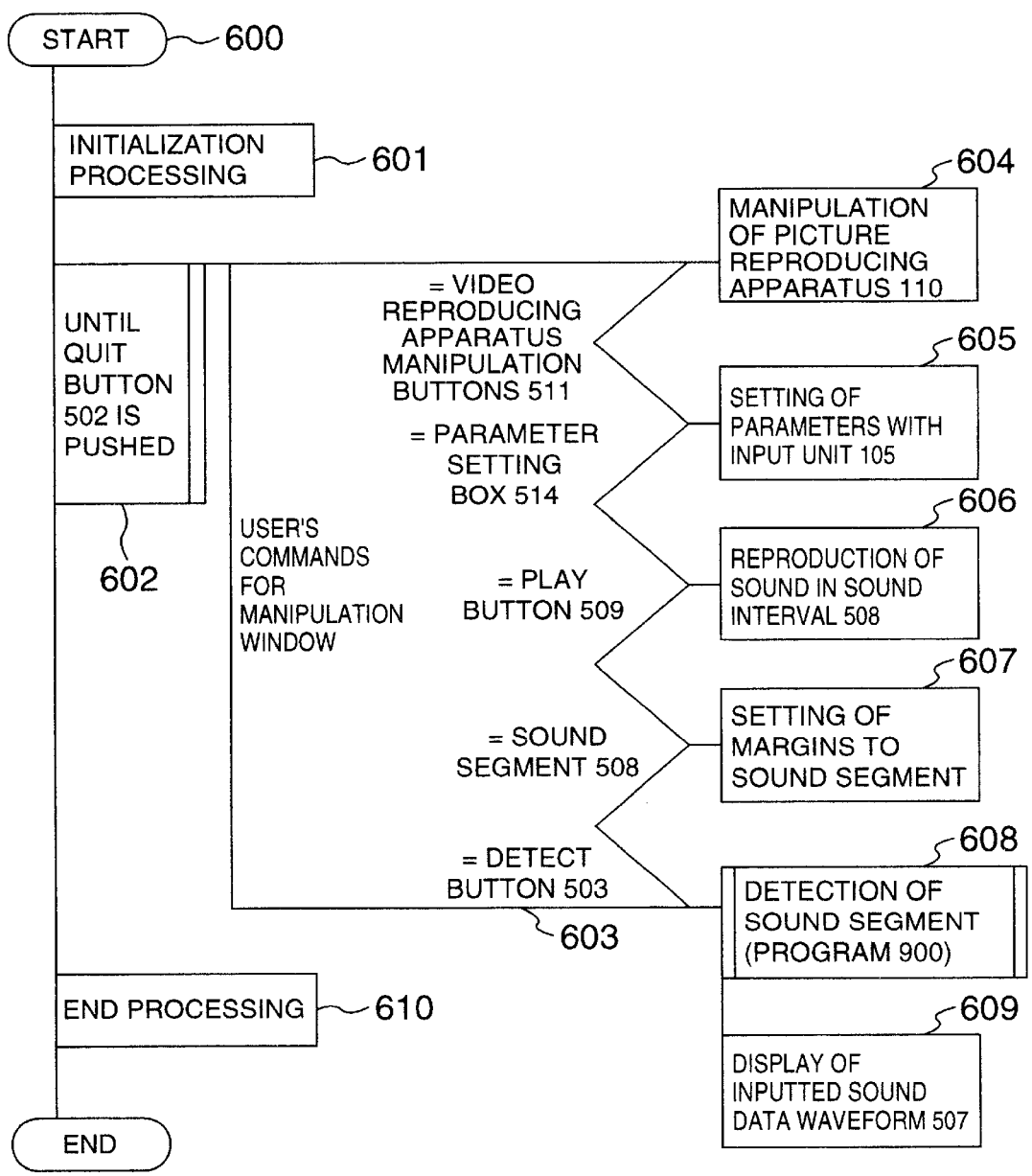
FIG. 6 is a flow chart for illustrating flow of processings on the whole.

FIG. 6 is a flow chart for illustrating flow of processings on the whole. In response to a program activation request inputted by a user, the CPU 107 reads out a program 600 from the auxiliary storage unit 106, which program is then placed on the memory 109 for execution. At that time, various sound data and processed data are also stored in the memory 109. Concerning the structure of these data, description will be made later on by reference to FIG. 10.

In a step 601, an initialization processing is executed upon starting of the processing. At the beginning, the CPU 107 allocates a memory area required for the processing on the memory 109 and clears it, whereon the CPU sets default values of the parameters such as the threshold value of the sound level and others. Subsequently, the manipulation window 501 of the sound processing unit 104 is displayed on the display device 101. Further, the setting for communication with the video reproducing apparatus 110 is initialized to open a communication port. In succession, the CPU sends a control command to the video reproducing apparatus 110 to set the reproducing operation of the picture reproducing apparatus 110 to the pause state (STAND BY ON). By setting the video reproducing apparatus 110 to the pause state instead of the stopped state, the video reproducing apparatus 110 can be put into operation instantaneously in response to another control command, which means that the sound signal and the frame number can be read out rapidly.

In a step 602, presence or absence of an end request issued by the user is decided. So long as the end request is not issued, the screen image control of the step 603 is executed repetitively.

In a step 603, processing procedure is branched in correspondence to a command button designated by the user. By way of example, when the user clicks the DETECT button 503 of the manipulation window 501, steps 608 and 609 are executed, whereupon inputting by the user is waited for. By increasing or decreasing the number and the variety of the command buttons disposed within the manipulation window 501, the number of branches as well as that of decisions as to the branching may be increased or decreased correspondingly, whereby most suitable processing can always be selected properly.

In steps 604 to 609, processings which correspond to the individual command buttons, respectively, are executed.

In the step 604, in response to designation of the button in the set of picture reproducing apparatus manipulation buttons 511, the processing corresponding to the designation is executed. This control processing can also be made use of as the processing for controlling the picture reproducing apparatus 110 in addition to the processing executed when one of the picture reproducing apparatus manipulation buttons 511 is clicked. At first, a control command is sent to the video reproducing apparatus 110 to receive a response status from the video reproducing apparatus 110. Subsequently, decision is made as to the response status. When error occurs, an error message is displayed on the display device 101 with the processing being suspended. When the control can be performed normally, the frame number is read out to be displayed in the display box 512, whereon return is made to the step 603.

In a step 605, parameter setting processing is executed in response to designation of the parameter setting box 514. When the parameter as set is altered in response to the input of a numeric value by the user through the input unit 105, the relevant parameter stored in the memory 109 is rewritten. Further, when the parameter concerning the time duration is altered, the time duration is converted into the data number in accordance with the sampling frequency of the (digitized) sound data.

In a step 606, a sound reproducing processing is executed for reproducing inputted sound data of the detected sound interval 508. When the start and end points of the sound interval are set in the detection result display panel 504, the sound data from the IN frame to the OUT frame displayed on the detection result display panel 504 is reproduced. In other words, the sound data stored in a sound data storing ring buffer 1050 is reproduced over a span from a start point data position 1052 to an end point data position 1053. In this way, the user can auditorily check the result of the detection.

In a step 607, a margin setting processing is executed for providing the detected sound segment with margins. The user drags the ends of the sound interval 508 to thereby widen the interval, whereby the margins can be set. At first, the time duration of the sound segment extending from the IN frame to the OUT frame displayed on the detection result display panel 504 is arithmetically determined. By setting previously the length of the time duration of every CM video (clip) to be constant, the upper limit of the margin can be determined definitely on the basis of the length of the time duration of the relevant sound segment. The margin is determined while supervising the manipulation of the user so that the upper limit is not exceeded, and the frame numbers corresponding to the start and end points are corrected. Through this procedure, the CM video of high quality which suffer no dispersion in respect to the time duration can be registered in the managing apparatus. As an alternative procedure, appropriate margins which meet the upper limit condition may be automatically affixed to the leading and trailing ends, respectively, of the interval. Unless limitation is imposed on the time duration length, the margin can be affixed in conformance with the user's request.

Figure 9:
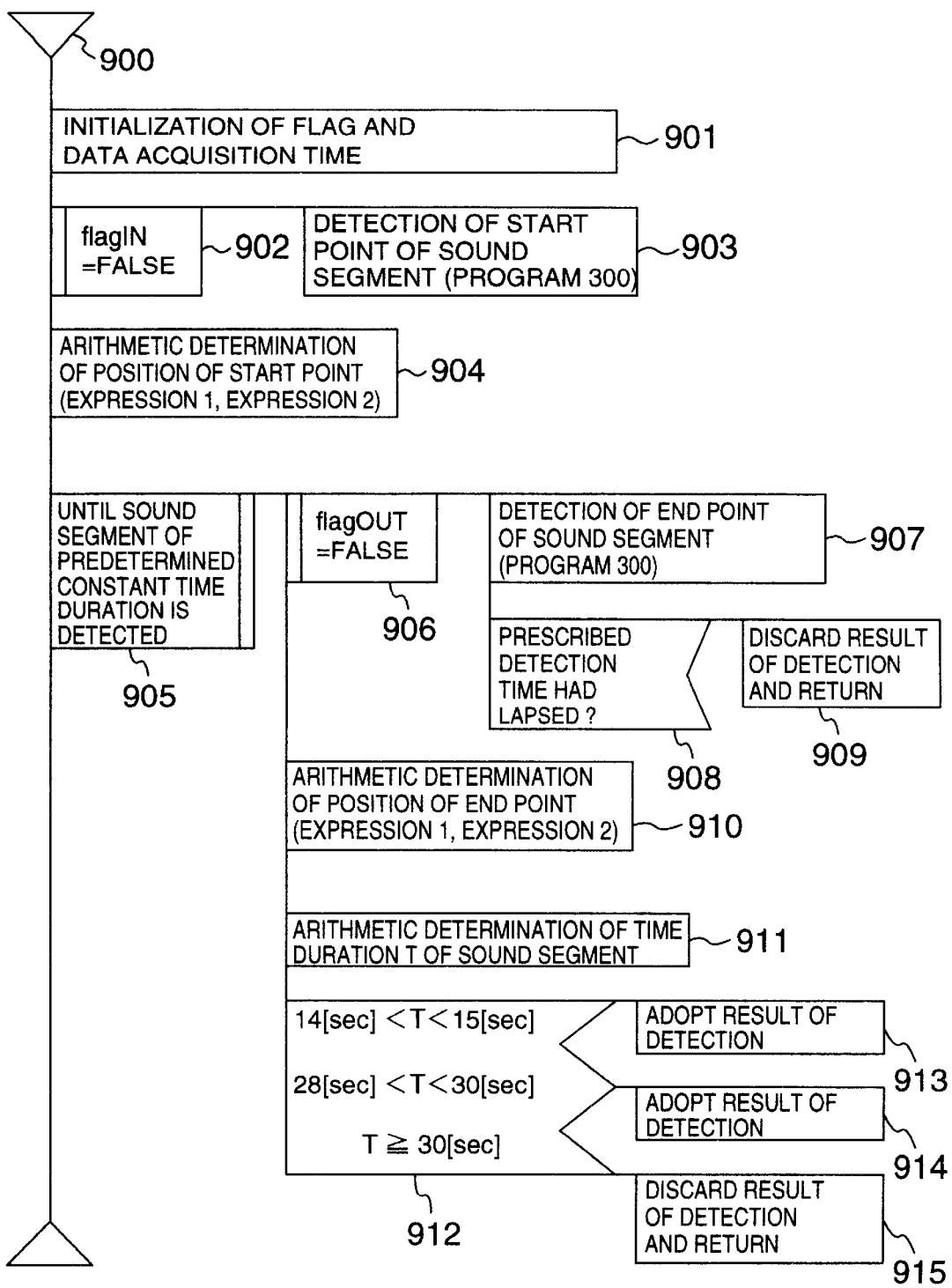
FIG. 9 is a flow chart for illustrating a flow of sound segment detection processing in which rules concerning time duration of a CM picture are adopted.

In a step 608, a processing for detecting the start and end points of the sound segment is executed. When the DETECT button 503 is designated, picture is reproduced by the picture reproducing apparatus 110 with the sound data being inputted from the sound input unit 103, whereon the start and end points of the sound segment are detected to be displayed on the detection result display panel 504. For more details, description will be made later on in conjunction with a program 900 (FIG. 9). Parenthetically, the program 900 represents a typical case in which the method of detecting the start and end points of the sound segment as illustrated in terms of the program 300 is applied to the sound segment detecting apparatus. In this conjunction, there may be mentioned an alternative method according to which the video of the video reproducing apparatus 110 is indexed to the start point of the sound interval after detection of the start and end points of the sound segment. Such head indexing can be realized by sending the frame number indicating the start point of the sound segment together with a search command to the video reproducing apparatus 110 from the sound processing unit 104.

In a step 609, the waveform 507 and the sound segment 508 are displayed on the panel 506. The sound data inputted until detecting both of the start and end points of the sound segment is performed is displayed as the waveform 507, while the period extending from the IN frame to the OUT frame displayed on the detection result display panel 504 is displayed as the sound segment 508. More specifically, the sound data of the sound data storing ring buffer 1050 are shifted one round, starting from an offset 1054, to thereby generate the waveform display. Additionally, the data interval sandwiched between the start point data position 1052 and the end point data position 1053 is displayed as the sound interval 508. In this way, the user can visually observe the results of detection.

In a step 610, an end processing is executed. At first, a control command is sent to the video reproducing apparatus 110 for setting the video reproducing apparatus 110 to the stopped state (STAND BY OFF), and then the communication port is closed. Subsequently, the manipulation window 501 generated on the display device 101 is closed. Finally, the allocated memory area is released, whereupon the processing comes to an end.

Now, disclosed are a control scheme and a filtering processing scheme which can be adopted for applying the sound segment start/end point detecting method described hereinbefore in conjunction with the program 300 to the sound segment detecting apparatus.

According to the program 300, it is possible to detect the start and end points after having inputted the whole sound data associated with the video (clip). However, when the sound data of long time duration is inputted en bloc, processing of long-time sound data obstructs the real-time detection of sound segments, because the time lag of the detection cannot be neglected. In order to ensure the real-time base for the detection, it is preferred to input and process the sound data of short-time repeatedly by dividing the whole sound data into pieces.

Figure 7:
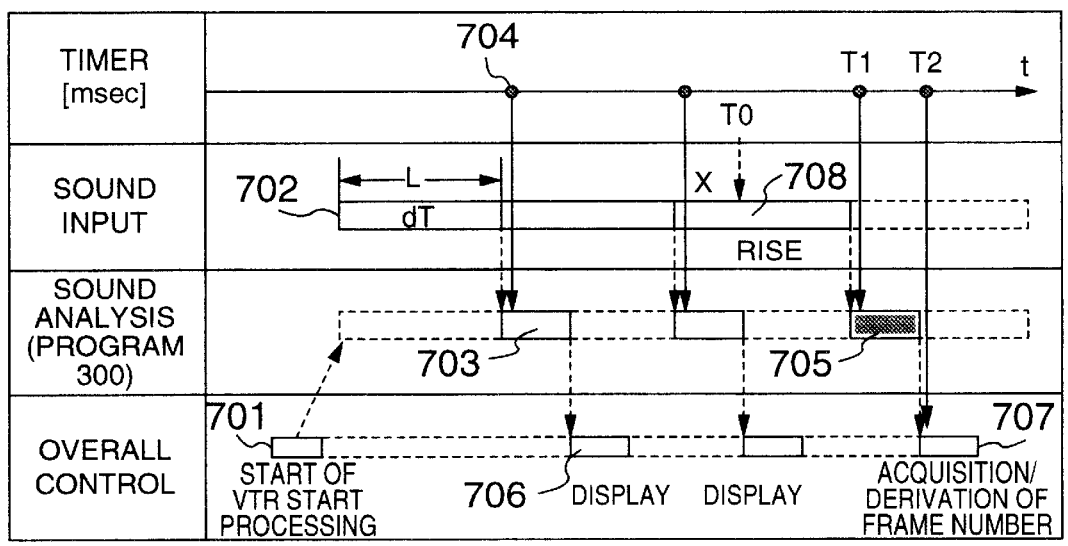
FIG. 7 is a view showing a control scheme of detection of the sound segment according to the present invention.

At first, a control scheme for realizing the real-time detection will be disclosed. FIG. 7 is a view showing a control scheme or system of the sound interval detecting apparatus according to the present invention and illustrates a process which can lead to the detection of the start point of the sound segment. Rectangles shown in the figure represent processings for the subjects to be controlled, wherein width of each rectangle represents the length of time taken for the relevant processing.

Reference numeral 702 designates the sound data input processing carried out in the sound input unit 103. The input sound is stored in the sound input unit 103 until a sound buffer of a predetermined time duration becomes full. At time point when the sound buffer becomes full, an interrupt signal indicating that the sound buffer is full is sent to the sound processing unit 104. The time duration length or width of the rectangle 702 represents the capacity of the sound buffer. In response to reception of the interrupt signal mentioned above, the sound processing unit 104 transfers the data of the sound buffer to the memory 109. Reference numeral 703 designates a sound analysis processing carried out in the sound processing unit 104 by executing the program 300. The sound processing unit 104 starts the sound analysis processing 703 from the time point when the interrupt signal arrived, to thereby execute the sound analysis processing until a succeeding interrupt signal is received. Assuming, by way of example, that the time duration length of the sound buffer mentioned above is set to one second, then a time of one second at maximum can be spent for executing the sound analysis processing 703. Parenthetically, the time of one second is sufficient for executing the sound analysis processing. Further, assuming that Ts is set at 200 msec with Tn being at 500 msec, the start point and the end point of sound can be detected by processing two pieces of sound data at maximum. In that case, the time lag involved from the start of inputting to the sound input unit 103 to the detection of the sound by the sound processing unit 104 can be suppressed to about 3 seconds at maximum, which means that the detection can be realized substantially on a real-time basis. The above-mentioned Ts and Tn represent lower limits for the lengths of elapsed time in the sound state and silence state, respectively, as described hereinbefore by reference to FIG. 4, and these numeric values may previously be set with reference to the time duration of one syllable of speech and/or the time duration of a pause intervening between aural statements. Since the amount of data transferred to the memory 109 is 11 kilobytes when the sampling frequency is set at 11 kHz, the sampling bit number is set at 8 bits and the channel number is set to one (monophonic) for the buffer capacity corresponding to one second, there will arise no problem concerning the time taken for the data transfer.

A flow of processings up to the detection of the start point will be elucidated. When the DETECT button 503 is clicked, a video is first reproduced by the video reproducing apparatus 110 through an overall control processing, which is then followed by activation of the sound data input processing 702, preparation for the sound segment detection processing and the start of timer counting of the time spent for the processing (701). When the sound data is inputted through the sound data input processing 702, the data arrival time point T1 is recorded on the memory 109 through the sound analysis processing 703 (704). Further, when the start point of the sound is detected through the sound analysis processing, a detection flag on the memory 109 is set "ON" (705). Upon completion of the sound analysis processing 703, the detection flag is sensed through the overall control processing. When the detection flag is "OFF", interim result is displayed on the sound waveform monitor 505 (706). On the other hand, when the flag is "ON", the current frame number is fetched from the video reproducing apparatus 110 with the frame number acquisition time point T2 being obtained from the timer, whereon the frame number and the reading time point mentioned above are stored in the memory 109. Further, by making use of the data arrival time point T1 and the frame number acquisition time point T2, the above-mentioned frame number is converted to the frame number at the time point at which the sound was started, whereon the frame number now obtained is stored in the memory 109 (707). In the case where the end point of the sound is to be detected in succession, the processings at 702 to 707 are executed repetitively until the end point is detected. Since execution of the processings 702 to 707 can be repeated any number of times, even a plurality of sound segments contained in one video entity can be detected, respectively.

Next, description will be directed to a method of deriving the frame number of the start point in the processing 707. It is assumed that the start point of the sound is contained at a position X in the sound data obtained through the sound data input processing 708. In that case, the time point T0 of the start point of the sound is estimated from the data arrival time point T1, the frame number acquisition time point T2 and the frame number TC2, whereon the frame number TC2 is converted to a frame number TC0 of the start point. This method can be represented by the following expressions:

$$T0 = T1 - dT(L-X)/L \text{[msec]} \quad \text{(Eq. 1)}$$

$$TC0 = TC2 - 1000(T2-T0)/30 \text{[frame]} \quad \text{(Eq. 2)}$$

where L represents the size of the sound buffer (number of data pieces), and dT represents the time duration of the sound buffer. In the case where the sound data is of 8 bits and monophonic, the sound buffer size L is nothing but the byte number of the sound buffer. In the expression Eq. 2, denominator "30" means that the number of frames is 30 per second in the case of the NTSC picture signal. The end point of the sound can equally be determined through a similar procedure.

With the control scheme described above, the start and end points of the sound segment can be detected substantially on a real-time basis.

Figure 8:
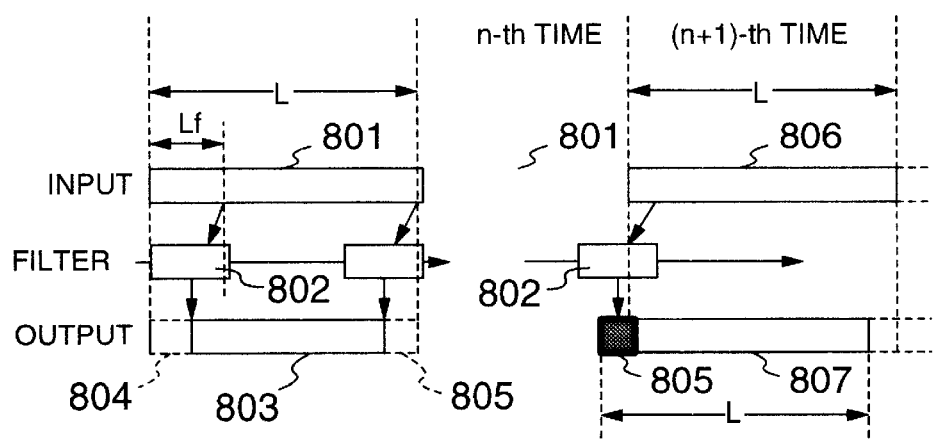
FIG. 8 is a view for illustrating positional relationship between input and output data in a filtering processing.

Next, description will turn to a processing procedure for filtering successively the sound data inputted, being divided. FIG. 8 is a view for illustrating positional relationship between the input data and the output data in the filtering processing step 303 or 304. Rectangles shown in the figure represent data arrays, respectively. More specifically, 801 designates an input data array (of data number L [pieces]), and 802 designates a filter buffer (data number Lf [pieces]). In the step 303, the filter buffer 802 corresponds to a filter of filter size 321 in the step 303 while corresponding to a filter of filter size 322 in the step 304.

Through the filtering processings in the steps 303 and 304, data of the input data array 801 are sequentially read out to be inputted to the filter buffer 802, whereon the maximum value or the minimum value is determined from all the data of the filter buffer 802 to be outputted as the data at a mid position of the filter size. In this case, a fragmental output data 803 is obtained from the whole input data of the input data array 801. Since Lf pieces of the input data of L pieces which corresponds to the filter size are used for initialization of the filter buffer 802, no output data can be obtained from a leading section 804 and a trailing section 805 of the output data array. In case the filter buffer 802 is initialized every time the data is received from the sound input unit 103 in the control scheme described hereinbefore by reference to FIG. 7, the envelope will be broken into fragments as a result of the filtering.

The filter buffer 802 is initialized only once in the start processing step 701. Thereafter, the filter buffer 802 is held without being cleared en route so that the position for the input data to be fetched in succession and the contents of data can be held continuously. Thus, for the (n+1)-th sound analysis processing, Lf pieces of data of the filter buffer 802 succeeded from the n-th sound analysis processing and L pieces of input data 806 in the (n+1)-th sound analysis processing can be made use of, whereby L pieces of output data, i.e., a sum of data in the data sections 805 and 807, can be obtained. In other words, L pieces of output data can be obtained for L pieces of input data, so that the filtering processing can be performed continuously for the sound data inputted dividedly.

In this conjunction, it should however be noted that the output data corresponding to the trailing section 805 in the n-th sound analysis processing can be obtained only after the input data 806 has been inputted in the (n+1)-th sound analysis processing. According to the control scheme illustrated in FIG. 7, the data positions X of the start and end points and the input data arrival time point T1 read out from the timer are used for computing the frame numbers at the start and end points of the sound, as expressed in the expression Eq. 1. For this reason, two data arrival time points in both the n-th and (n+1)-th sound analysis processings, respectively, are recorded in the memory 109. When the start and end points of the sound are found in the trailing section 805, the arrival time point in the n-th sound analysis processing is used whereas when the start and end points of the sound is found in the data section 807, the arrival time point in the (n+1)-th sound analysis processing is used.

Parenthetically, the filter size Lf may be set at a value which allows the difference resulting from subtraction (L−Lf) to be greater than zero. Basic frequency of voice of human being is generally higher than 100 Hz inclusive. Accordingly, by setting the number of data pieces contained in a time period not shorter than 10 msec, (e.g. one frame period of 33 msec), inverse of the basic frequency, there will arise no problem in determining arithmetically the envelope. Incidentally, the number of data pieces mentioned above can be determined by multiplying the time duration by the sampling frequency.

Through the procedure described above, the detection processing can be executed without bringing about discontinuity.

FIG. 9 shows a flow chart for illustrating a processing procedure for detecting the start and end points of the sound interval in which the control scheme and the filtering scheme described above are reflected, and FIG. 10 shows data structures of the sound data and control data stored in the memory 109.

The flow chart shown in FIG. 9 illustrates a flow of sound interval detection processing in which the time duration rules for the CM video (clips) are adopted. A program 900 is a processing program for detecting a pair of the start and end points of the sound segment. This program 900 is executed in a step 608. Globally, the program 900 is comprised of four processings. They are (1) processing for detecting the start point of the sound segment, (2) processing for detecting the end point of the sound segment, (3) decision processing relying on the time duration rules for the CM and (4) detection time limiting processing for terminating the detection process when a prescribed time duration lapses. The processing (1) is executed in steps 902 to 904, and the processing (2) is executed in steps 906, 907 and 910. Through these processing steps, control for the processings 703 to 707 shown in FIG. 7 is realized. The processing (3) includes a step 905 and steps 911 to 915. Through these processing steps, only the sound segment of a predetermined constant time duration can be sieved out. The processing (4) includes steps 908 and 909. Using these processing steps, an error processing is executed when no end point is found within an upper limit imposed on the time duration for executing the detection processing. It should however be mentioned that the processings required at least for detecting the sound interval are the processings (1) and (2). The processings (3) and (4) may be optional.

In the following, individual steps will be described in a sequential order.

A step 901 is provided for the initialization processing. The sound data and the control data to be stored in the memory 109 are initialized, whereon the control processing 701 described previously by reference to FIG. 7 is executed. More specifically, a sound buffer 1030, the sound data storing ring buffer 1050 and control parameters 1010 are initialized, and a vacancy flag 1042 for a filter buffer 1040 is set "TRUE".

In a step 902, decision is made as to the status of start point detection for a sound segment. A step 903 is executed until a start point flag "IN" 1017 becomes "TRUE".

In the step 903, the start point of the sound interval is detected. The program 300 is executed, and interim result is displayed on the sound waveform monitor 505. When the start point is detected, the flag "IN" 1017 is set "TRUE", and the current frame number is read out from the picture reproducing apparatus 110, and additionally the frame number acquisition time point T2 is read out from the timer.

In a step 904, the frame number of the start point as detected is arithmetically determined. The time point T0 of the start point is calculated in accordance with the expression Eq. 1, while the frame number TC0 of the start point is determined in accordance with the expression Eq. 2. The frame number TC0 of the start point is displayed in the detection result display panel 504 while the flag "IN" is reset to "FALSE".

In a step 905, decision is made as to the status of detection of the sound interval. Until the sound segment of a predetermined constant time duration is detected, processing steps described below are executed.

In a step 906, decision is made as to the status of end point detection for the sound segment. Steps 907 to 909 are executed until an end point flag "OUT" 1018 becomes "TRUE".

In the step 907, the end point of the sound segment is detected. The program 300 is executed, and interim result is displayed on the sound waveform monitor 505. When the end point is detected, the flag "OUT" 1018 is set "TRUE", and the current frame number is read out from the picture reproducing apparatus 110 while the frame number acquisition time point T2 is read out from the timer. In that case, the frame number of the end point is arithmetically determined in a step 910.

In the step 908, the time elapsed in the detection processing is decided. When the time point lapsed from the detection of the start point becomes longer than the prescribed detection limit time, it is then decided that the picture of the proper time duration is not contained in the picture being processed, whereupon the step 909 is executed. The prescribed detection time may set at 60 seconds which is twice as long as the CM time duration of 30 seconds. In case the current input data arrival time point T1 1022 satisfies the condition that T1>T2+60 [sec], where T2 represents the frame number acquisition time point in the step 903, decision is then made that the picture of concern is not the one of the proper time duration.

In the step 909, the detection result is discarded, whereupon the detection processing is intercepted. The start point detected in precedence is canceled. Further, data inputting from the sound input unit 103 is stopped, and the picture reproduction in the picture reproducing apparatus 110 is caused to pause with the sound buffer 1030 and the filter buffer 1040 being cleared.

In the step 910, the frame number of the end point as detected is arithmetically determined. The time point T0 of the end point is calculated in accordance with the expression Eq. 1, while the frame number TC0 of the end point is determined in accordance with the expression Eq. 2. The frame number TC0 of the end point is displayed on the detection result display panel 504 while the flag "OUT" is reset "FALSE".

In the step 911, the time duration T of the sound segment is calculated. To this end, difference between the time point of the start point determined in the step 904 and the time point of the end point detected in the step 910 is determined as T.

In a step 912, decision processing relying on the time duration rules for the CM is executed. When the time duration of the sound segment as detected meets the prescribed constant time duration, steps 913 and 914 are executed. By contest, when the prescribed constant time duration is exceeded, a step 915 is executed. Unless the prescribed constant time duration is met, detection of the end point of a succeeding sound segment is then resumed. Through this procedure, only the video having the sound segment of the prescribed constant time duration can be detected. In the case now under discussion, since the general rule "CM is so composed as to have the time duration of 15 seconds or 30 seconds per one" is adopted, the prescribed constant time duration is set to be 15 seconds or 30 seconds while tolerance is set to be one second for the prescribed constant time duration of 15 seconds with tolerance for the prescribed constant time duration of 30 seconds being set to be 2 seconds. However, these values may be altered appropriately in dependence on practical applications.

In the steps 913 and 914, the detected start and end points are adopted as the start and end points of the sound interval. The data input from the sound input unit 103 is interrupted, and the picture reproduction by the picture reproducing apparatus 110 is caused to pause while the sound buffer 1030 and the filter buffer 1040 are cleared.

In the step 915, the result of detection is discarded and the detection processing is interrupted. The detected start and end points are canceled, and the display on the panel 504 is cleared. Further, the data inputting from the sound input unit 103 is stopped with the picture reproduction by the picture reproducing apparatus 110 being caused to pause. The sound buffer 1030 and the filter buffer 1040 are cleared.

Through the procedure described above, only the sound segment of the prescribed constant time duration can be detected.

Figure 10:
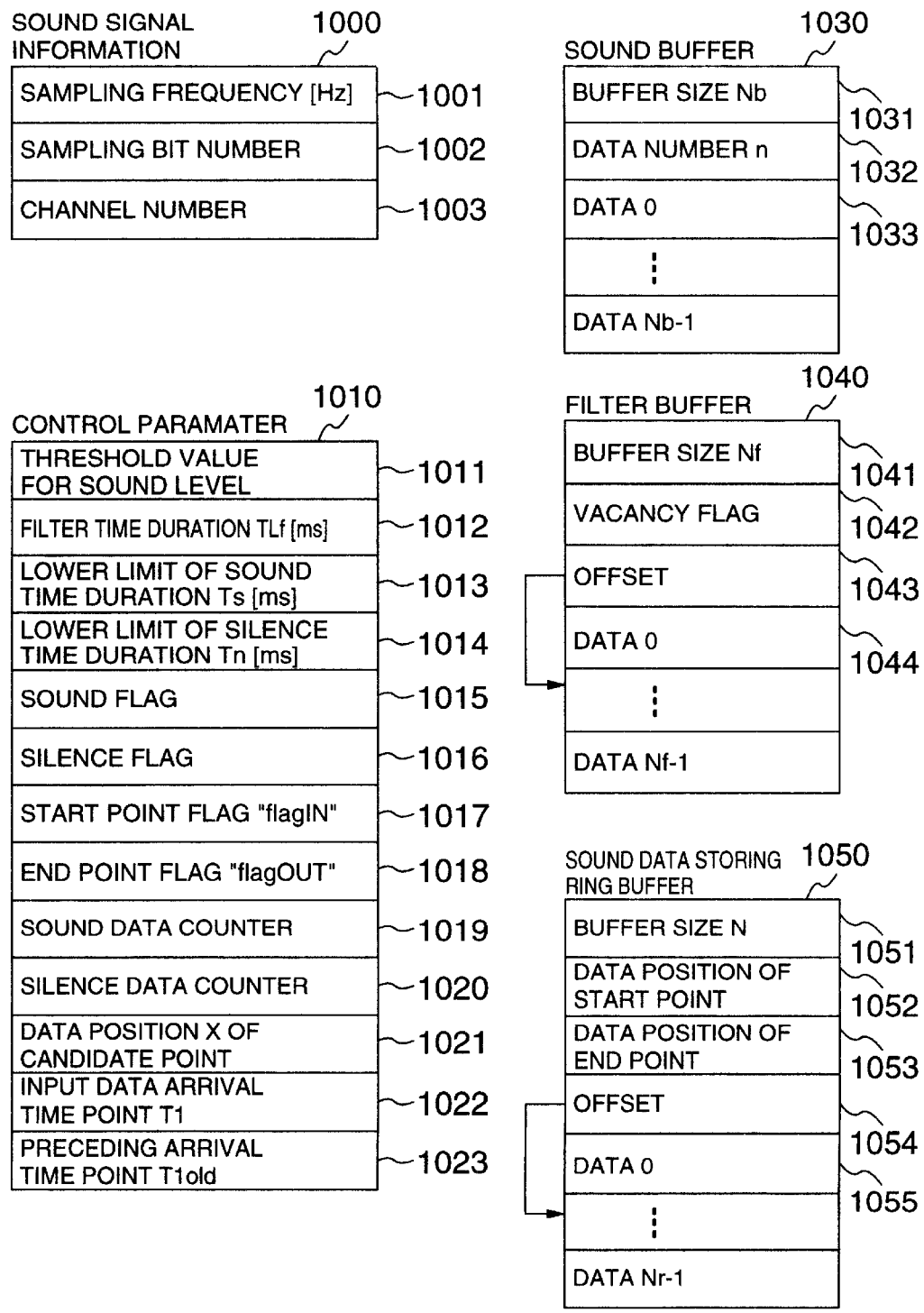
FIG. 10 is a view showing examples of data structures for realizing the sound segment detection according to the present invention.

Finally, description will be directed to data structures of the sound data and the control data stored in the memory 109. FIG. 10 is a view showing examples of the data structure for realizing the sound segment detection according to the present invention. Data for the processing are stored in the memory 109 to be read out to the CPU 107 as occasion requires.

Reference numeral 1000 designates sound signal information, which contains a sampling frequency 1001, a sampling bit number 1002 and a channel number 1003 ("1" for the monophonic, "2" for the stereophonic) which are used when the sound signal is digitized in the sound input unit 103.

Reference numeral 1010 designates control parameters. The various parameters and flags employed in the sound interval detection processing are stored. Reference numerals 1011 to 1014 designate variable parameters which can be changed on the parameter setting panel 513. Reference numerals 1015 to 1018 designate four flags indicating the states at the time points when the start and end points of the sound interval are decided, as described hereinbefore by reference to FIG. 4, and reference numerals 1019 and 1020 designate counters for counting the sound state and the silence state, respectively. The start point flag 1017 and the end point flag 1018 are set "FALSE" if the start and end points have not yet been detected while they are set "TRUE" when the start and end points have already been detected. Reference numeral 1021 designates the data position X of the start and end points in the input sound data described hereinbefore by reference to FIG. 7. Reference numerals 1022 and 1023 designate the data arrival time point T1 described hereinbefore by reference to FIG. 8 and the data arrival time point in the preceding sound segment detection processing, respectively. By reading out the frame numbers at the time points when it is detected that the flags 1017 and 1018 are "ON", the frame numbers of the start and end points can be arithmetically determined in accordance with the expressions Eq. 1 and Eq. 2, respectively. The frame numbers of the start and end points are stored in the memory 109 as well. As an alternative, the frame numbers determined arithmetically may be written in the auxiliary storage unit 106 in a sequential order. So long as the capacity of the auxiliary storage unit 106 permits, the sound intervals can be detected.

The sound buffer 1030 shows a data structure of a buffer which stores the processing data 311 to 315 transferred among the individual steps of the program 300. On the memory 109, there are prepared three buffers for the input, work and the output, respectively. The buffer size 1031 of these buffers are all set to a same value. Data number 1032 represents the number of data pieces stored in a relevant buffer 1030. As described hereinbefore by reference to FIG. 8, since the output data for the leading section 804 and the trailing section 805 cannot be obtained with only the first input buffer data, the data number of the output buffer decreases. Accordingly, the data number 1032 is prepared in addition to the buffer size 1031. Reference numeral 1033 designates processing data, i.e., data for the processings.

The filter buffer 1040 is realized in a data structure for a ring buffer employed for the maximum/minimum type filtering in the steps 303 and 304. In this conjunction, there are prepared on the memory 109 two data sets for the MAX filtering and the MIN filtering. The buffer size 1041 is arithmetically determined from the filter time duration TLf 1012. The vacancy flag 1042 indicates the initialized state of the filter buffer. The vacancy flag is set "TRUE" in the initialized state, where the filter buffer is vacant. On the other hand, once the filter buffer is filled with data, the vacancy flag is set "FALSE". When the vacancy flag 1042 is "TRUE" at the time when processing is performed on the input sound buffer 1030, initialization is achieved by copying the input data by a proportion equivalent to the size 1041. By contrast, when the vacancy flag is "FALSE", no initialization is performed. In this way, the envelope can be arithmetically determined without being accompanied with discontinuity. Reference numeral 1043 designates an offset indicating the position at which the succeeding input data is to be fetched. Reference numeral 1044 designates the input data fetched which represents the data to be subjected to the filtering processing.

Reference numeral 1050 designates a sound data storing ring buffer for copying the sound data inputted from the sound input unit 103 to thereby hold constantly the sound data by an amount corresponding to past several seconds. The data stored in the sound data storing ring buffer 1050 is used for displaying the sound data waveform 507 and reproducing the sound with the PLAY button 509. Reference numeral 1051 designates the buffer size. By selecting the buffer size 1051 to be an integral multiple of the buffer size 1031, copying can be easily carried out. Reference numeral 1052 designates a data position on the ring buffer which corresponds to the data position X of the start point of the sound interval described hereinbefore by reference to FIG. 7. Similarly, reference numeral 1053 designates a data position on the ring buffer which corresponds to the end point. Initially, values smaller than zero are set at the data positions 1052 and 1053 to be subsequently replaced by the values at the data position in accordance with the detection of the start and end points. Reference numeral 1054 designates an offset indicating the leading position of the location at which the succeeding input data is to be copied. Reference numeral 1055 designates the sound data.

Now, memory size for the data used in the sound segment detection processing will be estimated. Assuming, by way of example, that the sound signal information 1000 is monophonic sound data of 11 kHz and 8 bits and that the time duration which allows the sound data to be recorded in the input buffer is 1 second, the memory size demanded for the sound buffer 1030 is on the order of 11 kilobytes, and the total sum of the capacities of three buffers is on the order of 33 kilobytes. Assuming that the time duration for storing the sound is 40 seconds, the capacity required for the sound data storing ring buffer 1050 is on the order of 440 kilobytes. Assuming that the filter time duration is 30 msec., the capacity required for the filter buffer 1040 is on the order of 0.3 kilobytes. Thus, even a sum of capacities of two filter buffers is short of 1 kilobyte. For these reasons, the method according to the present invention can be carried out satisfactorily even by using an inexpensive computer whose memory size is relatively small.

With the arrangement taught by the present invention, the presence or absence of the sound which has heretofore been judged auditorily can be detected quantitatively and automatically, providing the effect that the man power involved in the sound segment detecting work can be reduced. It is sufficient for the operator to place a CM material in the picture reproducing apparatus and manipulate the buttons on the screen of the sound processing apparatus. Besides, in the manipulation, such complicated manipulations as video reproduction, pause or stopping and reverse reproduction as well as frequent repetition thereof are rendered unnecessary, to an advantageous effect in that the manipulation can be simplified. Furthermore, owing to such arrangement that the sound signal is inputted, being divided into shorter time intervals, the sound segment can be detected on a real-time basis, which is effective for enhancing the work efficiency. With regard to the confirmation work, because the sound in the sound segment as detected is displayed in the form of the waveforms and played, the result of detection can be instantaneously observed or confirmed visually and auditorily, which is advantageous from the view point of reduction of the man power involved in the confirmation work. Besides, owing to such arrangement that the sound segment can be detected by making use of the time duration rules for the CM video, improper material which is too lengthy or short can be canceled or discarded, there arises no necessity of inspecting additionally the time duration of the CM video. Furthermore, by virtue of such arrangement that margins can be affixed to the sound segment as detected, the CM videos (clips) of high quality which suffers essentially no dispersion in the time duration can be registered in the managing apparatus, which is advantageous from the standpoint of enhancing the quality of the registered videos.

Further, the filtering processing of the present invention which is employed for the arithmetic determination of the envelope can be carried out with a computer of a small scale such as a personal computer because of less overhead involved in computation when compared with computation of power spectra. Thus, the present invention provides such effect that the computation can be performed even when the sampling rate for the sound signal input is high.

The apparatus for carrying out the method of detecting the sound segment in the video can be realized by a small-scale computer such as a personal computer, whereby the detecting apparatus can be realized inexpensively.

INDUSTRIAL UTILIZABILITY

As is apparent from the foregoing description, the method and the apparatus for detecting the sound segments according to the teachings of the present invention is suited for application to a CM registering apparatus for registering CM clip constituted by video and audio by detecting the start point and the end point thereof.

Furthermore, the method and apparatus for detecting the sound segments according to the present invention can be made use of as a CM detecting apparatus for detecting an interval of a CM video inserted in a movie and a TV program.

What is claimed is:

1. A method of detecting start and end points of a sound segment in a video, comprising:
   receiving a sound signal recorded in a video program;
   determining an envelope of a waveform of the sound signal; and
   detecting one of a start point and an end point of an individual sound segment from the sound signal, at a time point at which said envelope intersects a preset threshold value for a sound level of the sound segment.

2. A method as claimed in claim 1, wherein a lower limit for the length of an elapsed time of a silence state is set, such that the time point at which said envelope intersects the threshold value for the sound level is detected as the start point or the end point of the sound segment when the elapsed time during which the value of the waveform envelope of the sound signal has remained smaller than the threshold value of said sound level is longer than said lower limit.

3. A method as claimed in claim 1, wherein a lower limit for the length of an elapsed time of a sound state is set previously, such that the time point at which said envelope intersects the threshold value for the sound level is detected as the start point or the end point of the sound segment when the elapsed time during which the value of the waveform envelope of the sound signal has exceeded the threshold value of said sound level is longer than said lower limit.

4. A method as claimed in claim 1, wherein the envelope of the waveform of the sound signal is arithmetically determined by filtering of the sound signal for a predetermined duration on a time-serial basis.

5. A method as claimed in claim 4, wherein the sound signal is filtered, via a maximum value filter for determining sequentially maximum values of the sound signal for a predetermined duration, and via a minimum value filter for determining sequentially minimum values of the sound signal for said predetermined duration.

6. A method as claimed in claim 1, wherein the threshold value of the sound level is set using the sound signal indicating a silence for several seconds without reproducing the video, and a maximum value of the sound level of noise.

7. An apparatus for detecting start and end points of a sound segment in a video, comprising:
   a video reproducing device to reproduce a video from a storage medium and to stop a video at a desired position designated by a user;
   a sound input unit to produce a sound signal recorded on an audio track of the video reproduced from the video reproducing device; and
   a sound processing unit to process the sound signal, including to determine start and end points of a sound segment from the sound signal, said sound processing unit comprising:
      envelope arithmetic means for determining arithmetically an envelope of a waveform of the sound signal;
      threshold value setting means for setting a threshold value of a sound level for values of said envelope;
      start/end point detecting means for detecting a time point at which said threshold value of the sound level and said envelope intersects each other as a start point or an end point of the sound segment;
      frame position determining means for determining a frame position of the video at a time point at which the start point or the end point of the sound segment is detected; and
      display means for displaying the frame position of the start point or the end point of the sound segment.

8. An apparatus as claimed in claim 7, wherein said frame position determining means comprises:
   timer means for counting the elapsed time, starting from the start of the detection processing,
   means for reading out the frame position of the video,
   elapsed time storage means for storing elapsed time at a time point at which the start point or the end point of the sound signal is detected and the elapsed time at a time point at which said frame position is read out, and
   frame position correcting means for correcting the frame position as read out by using difference between both the elapsed times.

9. An apparatus as claimed in claim 7, wherein said sound processing unit further comprises means for stopping reproduction of the video at the frame positions corresponding to the start and end points of the sound segment.

10. An apparatus for detecting start and end points of a sound segment in a video, comprising:
    a video reproducing device to reproduce a video and to stop a video at a desired position designated by a user;
    a sound input unit to produce a sound signal recorded on an audio track of the video; and
    a sound processing unit to process the sound signal, including to determine start and end points of a sound segment from the sound signal, said sound processing unit comprising:

envelope arithmetic means for determining arithmetically an envelope of a waveform of the sound signal, threshold value setting means for setting previously a level of threshold for values of said envelope, start point detecting means for detecting as a start point of a sound segment a time point at which said envelope exceeds the level of said threshold, end point detecting means for detecting as an end point of the sound segment a time point at which said envelope falls below the level of said threshold, frame position determining means for determining frame positions of the video at time points at which said start point and said end point are detected, respectively, frame position storage means for storing individually the frame positions of said start point and said end point of the sound segment, and display means for displaying individually said frame positions of said start point and said end point, to thereby display the frame positions of said start point and said end point of the sound segment.

11. An apparatus as claimed in claim 10, wherein said sound processing unit includes buffer memory means for storing the sound signal inputted on a time-serial basis, and that when the start point and the end point of the sound segment are detected, a waveform in the sound segment is displayed on said display means.

12. An apparatus as claimed in claim 10, wherein said sound processing unit includes reproducing means for reproducing the sound signal in the sound segment at the time points when the sound signal as well as the start point and the end point of the sound segment are detected.

13. An apparatus as claimed in claim 10, wherein said sound processing unit includes time duration length setting means for setting an upper limit of a predetermined duration of the sound segment and a tolerance range, and time duration comparison means for comparing a detected duration extending from the start point to the end point of the sound segment as detected with a set duration, and that when said detected duration is shorter when compared with said set duration, the succeeding end point of the sound segment is detected while holding the start point of the sound segment, whereas when said detected duration is longer when compared with said set duration, detection is terminated with result of the detection being discarded, while when said detected duration falls within the tolerance range of sound data, the detection is intercepted with the result of the detection being held and the detection is terminated unless the end point of the sound segment is detected even when said detected duration exceeds a time duration twice as long as said set duration.

14. An apparatus as claimed in claim 13, wherein the upper limit of the predetermined duration of the sound segment is set to be 15 seconds or 30 seconds, the tolerance range is of one or two seconds, and that the video subjected to the detection processing is a commercial video clip.

15. An apparatus as claimed in claim 13, wherein said sound processing unit includes margin setting means for setting margins at a front side in precedence to the start point of the sound segment and at a rear side in succession to the end point of the sound segment, respectively, and that when said detected duration of the sound segment falls within said tolerance range of said set duration, results of shifting the detected start point and the detected end point frontwards and rearwards, respectively, are determined as the start point and the end point, respectively, of the sound segment.

16. A method of detecting start and end points of a video associated with a sound segment, comprising:

receiving a video signal having a sound signal;

determining an envelope of a waveform of the sound signal; and detecting a start point of a sound segment on the basis of continuity of a silence segment in the waveform of the sound signal, and an end point of the sound segment on the basis of a falling point of the sound segment.

17. A method as claimed in claim 16, wherein frames constituting the video are derived from the video signal to be displayed at a predetermined time interval on a time-serial basis, the waveform representing the sound signal and a display bar representing said video frame interval are displayed along with said frame display on the time-serial basis, and that frame numbers of the start point or the end point of said video frame interval are set again by modifying said video frame interval bar along a time axis on display.

18. A method as claimed in claim 17, wherein the start point or the end point of the sound segment is determined at a time point at which a preset threshold value of a sound level of the sound segment and said envelope intersect each other.

19. A method of detecting audio segments in a video clip, comprising:

receiving audio data associated with a video clip;

obtaining a waveform of the audio data;

determining an envelope of the waveform of the audio data using maximum and minimum value filters;

making a comparison between the audio data within the envelope and a threshold value preset for an audio level; and detecting a start point and an end point of each audio segment in the video clip based on said comparison.

20. A method as claimed in claim 19, wherein the start point or the end point of an audio segment in the video clip is detected at a time point at which the audio data within the envelope intersects the threshold value preset for the audio level.

21. A method as claimed in claim 20, wherein the start point of the audio segment is detected at the time point when an audio state has lasted longer than a first time duration designated for the audio state, after a silence state lasted longer than a second time duration designated for the silence state; and wherein the end point of the audio segment is detected at the time point when the silence state has lasted longer the second time duration, after the audio state lasted longer than the first time duration.

22. A method as claimed in claim 19, wherein the audio data is filtered, via the maximum value filter, to determine sequentially maximum values of the audio data for a predetermined duration, and via the minimum value filter, to determine sequentially minimum values of the audio data for the predetermined duration on a time-serial basis.

23. An apparatus for detecting audio segments in a video clip, comprising:

a video playback arranged to reproduce a video clip from a storage medium;

a sound input unit arranged to separate audio data associated with the video clip reproduced from the video playback;

a display unit; and a sound processor unit coupled to receive the audio data associated with the video clip, and configured to perform the following:

obtain a waveform of the audio data;

determine an envelope of the waveform of the audio data;

make a comparison between the audio data within the envelope and a threshold value preset for an audio level; and detect a start point and an end point of each audio segment in the video clip based on said comparison; and provide a visual display of the start point and the end point of each audio segment in the video clip on said display unit.

24. An apparatus as claimed in claim 23, wherein the sound processor unit is configured to detect the start point or the end point of an audio segment in the video clip at a time point at which the audio data within the envelope intersects the threshold value preset for the audio level.

25. An apparatus as claimed in claim 24, wherein the sound processor unit is configured to detect the start point of the audio segment at the time point when an audio state has lasted longer than a first time duration designated for the audio state, after a silence state lasted longer than a second time duration designated for the silence state; and to detect the end point of the audio segment at the time point when the silence state has lasted longer the second time duration, after the audio state lasted longer than the first time duration.

26. An apparatus as claimed in claim 23, wherein the sound processor unit comprises maximum and minimum value filters such that audio data is filtered, via the maximum value filter, to determine sequentially maximum values of the audio data for a predetermined duration, and via the minimum value filter, to determine sequentially minimum values of the audio data for the predetermined duration on a time-serial basis.

* * * * *